United States Patent
Jorgensen et al.

(10) Patent No.: US 8,054,833 B2
(45) Date of Patent: Nov. 8, 2011

(54) PACKET MIRRORING

(75) Inventors: Steven G. Jorgensen, Newcastle, CA (US); Mark Gooch, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 11/810,368

(22) Filed: Jun. 5, 2007

(65) Prior Publication Data

US 2008/0304498 A1    Dec. 11, 2008

(51) Int. Cl.
*H04L 12/28* (2006.01)
(52) U.S. Cl. ............. 370/390; 370/395.31; 370/401
(58) Field of Classification Search ............. None
See application file for complete search history.

(56) References Cited

U.S. PATENT DOCUMENTS

| | | | |
|---|---|---|---|
| 6,763,018 B1 | 7/2004 | Puthiyandyil et al. | |
| 6,785,286 B1* | 8/2004 | O'Keeffe et al. | 370/397 |
| 7,103,045 B2 | 9/2006 | Lavigne et al. | |
| 7,111,072 B1 | 9/2006 | Matthews et al. | |
| 7,159,242 B2 | 1/2007 | Genty et al. | |
| 7,555,562 B2* | 6/2009 | See et al. | 709/240 |
| 2005/0114522 A1 | 5/2005 | LaVigne et al. | |
| 2005/0120243 A1* | 6/2005 | Palmer et al. | 713/201 |
| 2005/0220091 A1* | 10/2005 | LaVigne et al. | 370/389 |
| 2005/0220092 A1* | 10/2005 | LaVigne et al. | 370/389 |
| 2006/0095968 A1* | 5/2006 | Portolani et al. | 726/23 |
| 2006/0114831 A1* | 6/2006 | Buduma et al. | 370/241 |
| 2008/0263666 A1* | 10/2008 | Keohane et al. | 726/23 |

* cited by examiner

*Primary Examiner* — Chirag Shah
*Assistant Examiner* — Salvador E Rivas

(57) ABSTRACT

Network devices, systems, and methods are provided for packet processing. One network device includes a network chip including logic and a number of network ports for the device for receiving and transmitting packets therefrom. The logic is operable to mirror packets on a per port per virtual local area network (VLAN) membership basis.

19 Claims, 9 Drawing Sheets

PACKET MIRRORING

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include a network appliance (NA), e.g., intrusion prevention system (IPS) and/or intrusion detection system (IDS) that serves to detect unwanted intrusions/activities to the computer network. Unwanted network intrusions/activities may take the form of attacks through computer viruses and/or hackers, among others, trying to access the network. To this end, a NA can identify different types of suspicious network traffic and network device usage that can not be detected by a conventional firewall. This includes network attacks against vulnerable services, data driven attacks on applications, host based attacks such as privilege escalation, denial of service attacks, port scans, unauthorized logins and access to sensitive files, viruses, Trojan horses, and worms, among others. A NA can also include other forms of diagnostic devices, accounting devices, counting devices, etc., operable on network packets of interest.

In previous approaches, to identify suspicious network traffic or to properly account for the traffic, data traffic needed to pass through a point of the network where a NA is located. That is, network appliances used to be solely deployed as in-line devices, and recently have become a shared resource local to one network device, e.g., switch, router, etc. If the NA is not "in-line", e.g., between one port and another in a network packet's intended path, then suspicious activity may not be detected, or the packets properly counted. For large network systems, placing a NA in-line with all possible network packet intended paths can be both expensive to implement and very complex to maintain.

In previous approaches, IP subnets and virtual local area networks (VLANs), as the same are known by one of ordinary skill in the art, were used to address the above issue. In this approach only data packet traffic crossing a layer 2, e.g., bridged, domain would be sent to the router, which may apply additional security, accounting, or diagnostic checks. However, in today's networks group membership is not always easily divided among subnets or VLANs.

Link aggregation control protocol (LACP) is a standard in IEEE 802.3ad which defines a method of aggregating links together to form a more redundant link with larger bandwidth. An aggregate link, also known as a "trunk", is formed either manually or dynamically. A manual trunk comes into existence when a network administrator physically configures LACP on multiple network devices that are connected together with a set of links, e.g., physical (Layer 1) connections. A dynamic trunk can come into existence when an administrator has previously configured multiple network devices to support "dynamic" LACP, and when two or more links are connected between the switches.

When links are aggregated, the aggregated traffic is often more than a network appliance can handle. Additionally, when VLANs are being used, an aggregated link may have traffic that resides on multiple of these VLANs, and only a subset of these VLANs may be of interest to monitor.

DETAILED DESCRIPTION

Figure 1:
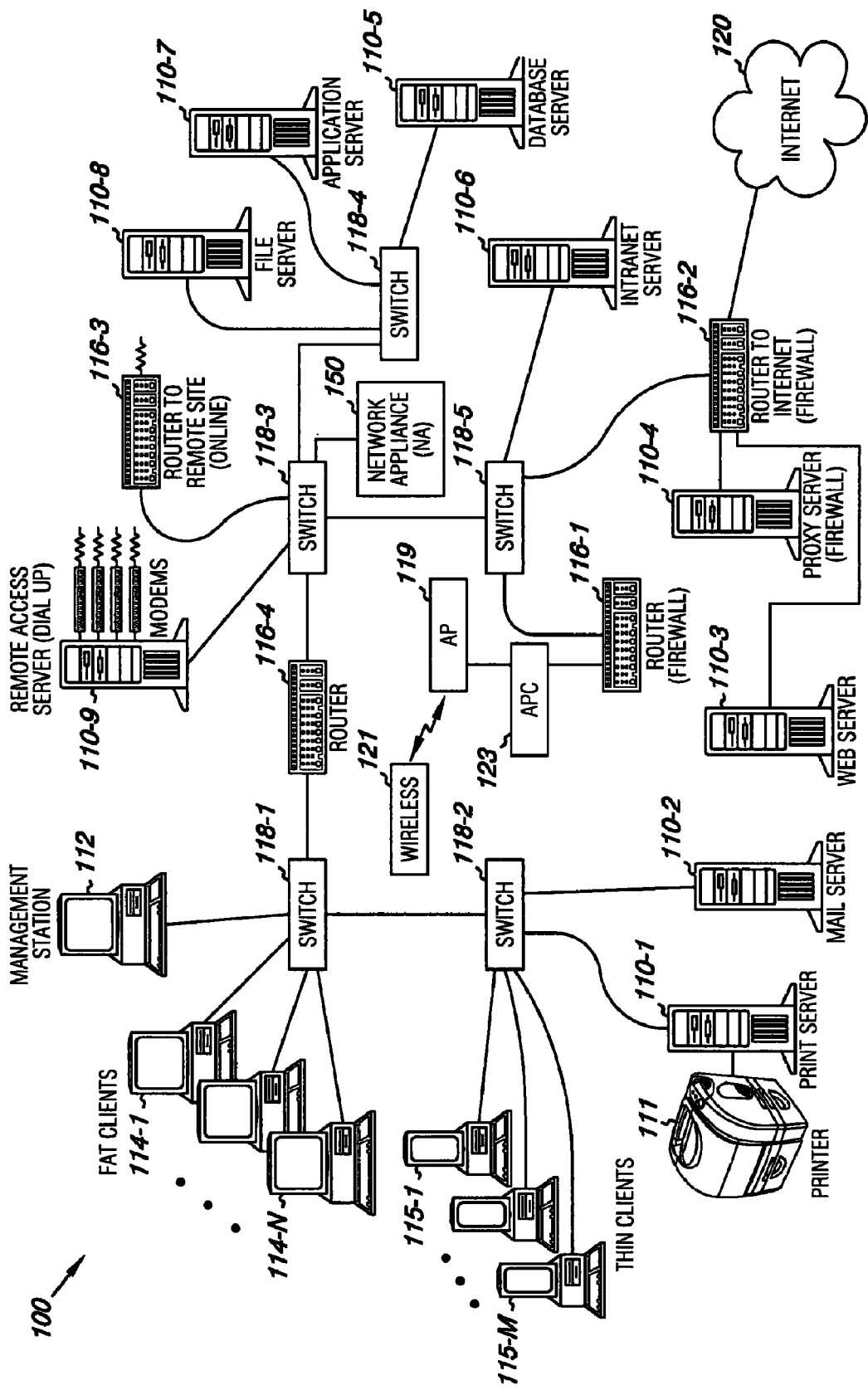
FIG. 1 is an example of a computing device network in which certain embodiments of the invention can be implemented.

Embodiments of the invention may include network devices, systems, and methods, including executable instructions and/or logic, which may be used for packet mirroring. According to one embodiment a network device includes a network chip including logic and a number of network ports on the device for receiving and transmitting packets therefrom. The logic is operable to mirror packets on a per port per virtual local area network (VLAN) membership basis.

In some embodiments, the mirrored packets are mirrored to a checking functionality. As used herein, "checking functionality" (CF) means an intrusion prevention system (IPS), an intrusion detection system (IDS), and can also include other forms of diagnostic devices, accounting devices, counting devices, etc., operable on network packets of interest, whether connected as a network appliance (e.g., 250-1 or 250-2, as described in connection with FIG. 2) or whether provided as logic integral to a particular network device (e.g., 241, 270, 260, or 265, as described in connection with FIG. 2).

A checking functionality can include a network appliance supplied by a third party vendor of network security devices or otherwise. As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. The operations of such devices will be recognized and understood by one of ordinary skill in the art. A checking functionality can be provided in the form of software, application modules, application specific integrated circuit (ASIC) logic, and/or executable instructions operable on the systems and devices shown herein or otherwise.

"Software", as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (such as Flash memory), etc.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

In some embodiments, logic in the form of hardware, e.g. application specific integrated circuits (ASICs) on a network chip, receives a network packet. The logic processes packets on ingress to the chip to determine a number of filter indices, which are then used on egress to determine to which port(s) a packet should be sent. According to some embodiments, a particular "filter index" (e.g., "mirror" filter index, described in more detail in FIG. 4) is used to determine a port mask, which is used to mirror packets on a per port per VLAN basis. The logic may derive some filter indices associated with a particular packet on the packet's source/destination port information, media access controller (MAC) information, internet protocol (IP) lookups, access control list (ACL) entries, etc.

According to embodiments, a mirror filter index can be applied to either input or output traffic on a given network device. For example, the mirror filter index can be configured to be applied to a packet when a packet is either received on a particular input port or determined to be destined to a particular output port. Multiple actions can be taken on a mirrored and/or mirror-stolen packet and differentiated for the same port on different VLANs. In some cases a packet may or may not be mirrored and/or mirror-stolen from the same port on different VLANs. In this manner, the limited bandwidth of a checking functionality may be more efficiently used while at the same time not requiring the network topology to be constrained by artificial subnet and/or VLAN boundaries.

As used herein, a "network" can provide a communication system that links two or more computers and peripheral devices, and allows users to access resources on other computers and exchange messages with other users. A network allows users to share resources on their own systems with other network users and to access information on centrally located systems or systems that are located at remote offices. It may provide connections to the Internet or to the networks of other organizations. Users may interact with network-enabled software applications to make a network request, such as to get a file or print on a network printer. Applications may also communicate with network management software, which can interact with network hardware to transmit information between devices on the network.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 1108, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions (e.g., computer executable instructions), as described in more detail here, can reside on some network devices. For example, program instructions in the form of firmware, application modules, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 118-4, 118-5, etc., and can be executable by the processor(s) and/or logic (e.g., hardware in the form of transistor gates) thereon. Also, program instructions can be resident in a number of locations on some network devices in the network 100 as can be employed in a distributed computing network. A "distributed computing network" refers to the use of multiple computing devices, e.g., having processor and memory resources, in a network to execute various roles, e.g., application processing, etc., as described herein.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, ..., 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switch 118-3 and router 116-4, may be referred to topographically as "central network devices". As used herein, "edge network devices" topographically means network devices, e.g., 118-1, having ports connected directly to network clients, e.g. 114-1, ..., 114-N on the "edge" of a network. The network clients can include servers, "fat" and "thin" clients, including mobile network clients connected through an APC, etc., as discussed above. As used herein, "central network devices" topographically means network devices, e.g., 118-3, which are connected to other network devices, e.g. 118-4, but which are not necessarily connected directly to network clients such as 115-1, ..., 115-M and 114-1, ..., 114-N, etc.

However, the term "central" in central network devices is not to be confused with the use of the term "centralized". In some embodiments, a "centralized" CF, as defined above, may be integral to or associated with an edge network device. That is, the topographical location in a given network of the CF can be in association with switch 118-1, connected to "fat" and "thin" clients, 114-1, ..., 114-N, and 115-1, ..., 115-M, in FIG. 1, or equally in association with switch 118-3, or switch 118-5, etc. Embodiments are not limited to the examples described herein. As one or ordinary skill in the art will appreciate, the intent is to place a CF in a topographical location in network 100 which has a sufficiently high bandwidth associated therewith relative to the bandwidth of other devices attached to the network 100 to perform a sufficient throughput associated with a particular CF. As the reader will appreciate, certain so termed "edge network devices", e.g., switch 118-1, may in fact have a large network packet traffic bandwidth capability relative to other network devices, e.g., 118-3, 118-4, etc., in the network 100 so as to be worthwhile candidates for associating a CF therewith. Embodiments are not limited to the examples given in connection with FIG. 1.

In the example network implementation of FIG. 1, a network appliance 150 is shown in association with switch 118-3. The network appliance 150 serves as a checking functionality. As the reader will appreciate, a network appliance 150 can include processor and memory resources capable of storing and executing instructions to perform a particular role or function. A network appliance can also include one or more network chips (e.g., ASICs) having logic and a number of ports.

In certain embodiments, the checking functionality performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
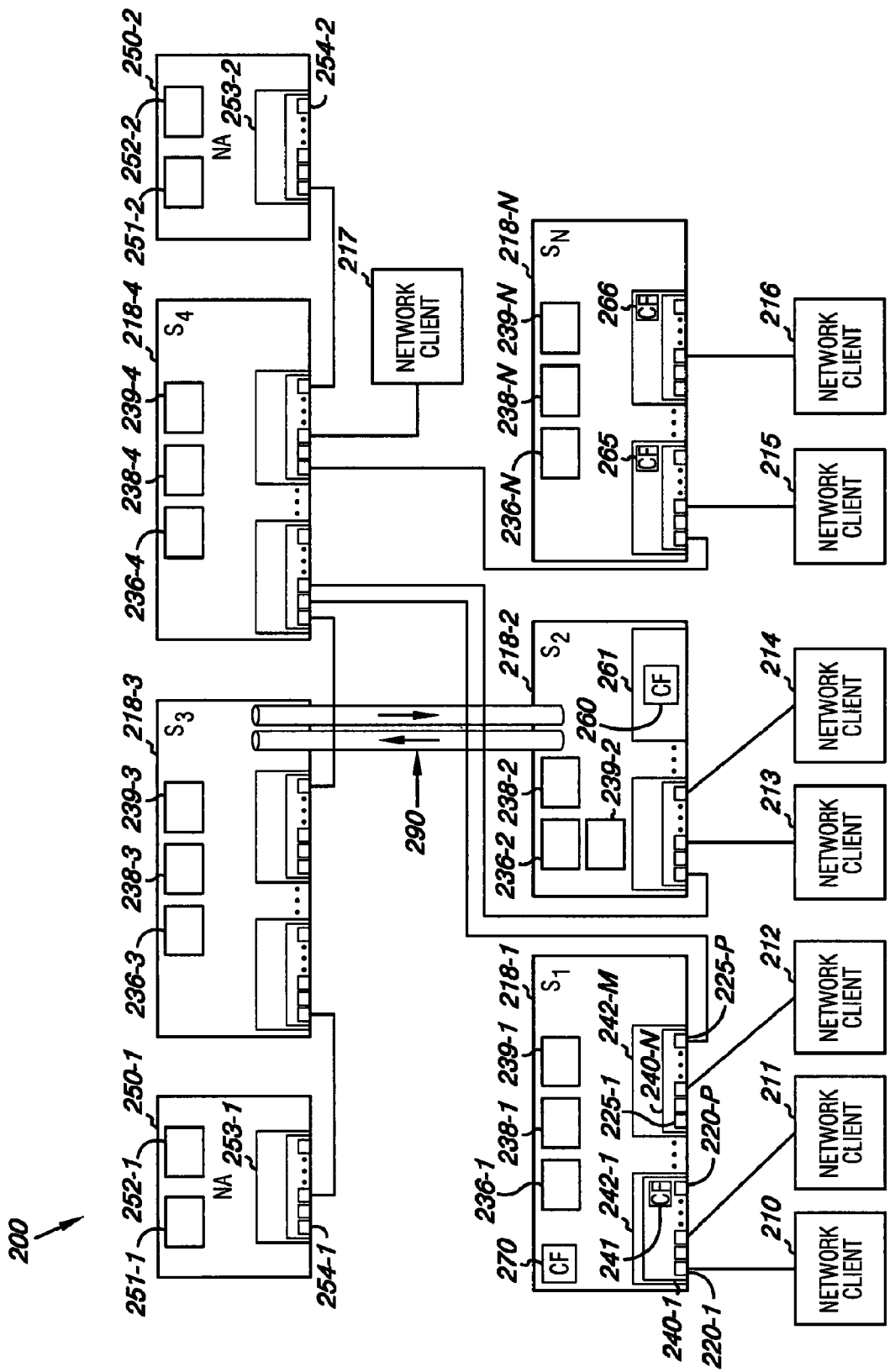
FIG. 2 illustrates a portion of a network, such as shown in FIG. 1, which includes network devices in which certain embodiments of the present invention can be implemented.

FIG. 2 illustrates a portion 200 of a network, e.g., network 100 shown in FIG. 1, including embodiments of network devices, 218-1, 218-2, ..., 218-N suited to implement embodiments of the present invention. By way of illustration and not by way of limitation, some of the network devices are "edge network devices", e.g., 218-1, having ports connected directly to network clients, e.g. 210, ..., 217. The network clients can include "fat" and "thin" clients, including mobile network clients connected through an APC 123, etc., as discussed above in connection with FIG. 1. Additionally, by way of illustration and not by way of limitation, some of the network devices are "central network devices", e.g., 218-3 which are connected to other network devices, e.g., 218-4, but which are not be connected directly to network clients, 210, ..., 217, mobile devices, etc.

As described in connection with FIG. 1, the network devices, 218-1, 218-2, ..., 218-N, of FIG. 2 can include switches, routers, hubs, etc. (shown as switches in FIG. 2). Such network devices, 218-1, 218-2, ..., 218-N, can include processor, e.g., 236-1, ..., 236-N, and memory, e.g., 238-1, ..., 238-N, resources. The network devices, 218-1, ... 218-N, can similarly include a number of printed circuit boards, or "blades", 242-1, ..., 242-M, which can include a number of network chips, e.g., 240-1, ..., 240-N, including logic circuitry (hardware). Each network chip, 240-1, ..., 240-N, can include a number of network ports, 220-1, 220-2, ..., 220-P to send and receive data packets (network traffic) throughout the network 200. The logic circuitry of the number of network chips, e.g., 240-1, ..., 240-N, can be in the form of an application specific integrated circuit (ASIC) and include logic to serve as a media access controller (MAC).

As shown in FIG. 2, a number of ports 220-1, ..., 220-P can be included on a network chip 240-1, ..., 240-N and have access to logic circuitry associated with any of the network chips 240-1, ..., 240-N and to the processor 236-1, ..., 236-N and memory 238-1, ..., 238-N through a crossbar, crosslink, and/or switching fabric 239-1, ..., 239-N as the same will be understood by one of ordinary skill in the art. As used herein, the designators "M", "N", and "P" are used to illustrate that networks can have a number of network devices, that a given network device may have a number of blades, and that the network devices may support or contain a different number of ports. Embodiments are not limited to the example shown in FIG. 2.

As shown in the embodiment of FIG. 2, network appliances 250-1 and 250-2 can be connected to a network device in a centralized location. The centralized location may be connected to a central network device, e.g., 218-3 (network device not connected directly to network clients), or may be connected to an edge network device, e.g. 218-4 (network device connected directly to network clients). As shown in FIG. 2, a given network appliance 250-1 can include processor 251-1 and memory 252-1 resources capable of storing and executing instructions to perform a particular role or function. The network appliance can also include one or more chips (ASICs), e.g., 253-1, having logic and a number of ports 254-1, as the same have been described above.

The network appliances 250-1 and 250-2 serve as a checking functionality. As also shown in the embodiment of FIG. 2, in some embodiments, a checking functionality (CF) may be embedded, either within a network device's ASIC (e.g., 241), or on the port blades (265, 266), or just within the network device itself, either as a plug-in blade (e.g., CF 260 on plug-in blade 261), or built in to the network device (e.g., 270). Embodiments of the invention are not limited to the actual location of the checking functionality with the network 200.

As described in connection with FIG. 1, the CF can be an intrusion detection system (IDS), or another diagnostic device, accounting device, counting device, etc., as may be supplied by a third party vendor of network checking devices. Embodiments are not limited to the examples given here.

In the embodiment of FIG. 2, a network packet, e.g., data packet, is received by a port, e.g., 220-1, on a network device, e.g., switch 218-1, from a network client, e.g., 210. According to embodiments, logic on the network device 218-1, e.g., associated with an ASIC of a network chip 240-1, can apply a per port per VLAN mask that can be compared with either a destination or input port, 220-1, 220-2, ..., 220-P. That is, the logic can define a filter index in association with a network packet to mirror a packet on a per port per VLAN basis. As will be explained in more detail below, the logic can deny access to ports outside the mirror filter and "mirror-steal" (defined below) the packet to a checking functionality CF (e.g., 241, 270, 260, etc.).

In some embodiments the logic will tunnel encapsulate selected, "mirror-stolen", data packets and can forward those packets to the network appliance 250-1 through a secure tunnel. As used herein the term "mirror-stealing" means the packet is denied access to ports outside of the mirror filter and a copy of the packet is forwarded to the CF, e.g., network appliance 250-1. "Mirror-stealing" additionally means that the logic does not prevent the packet from being forwarded to ports which are members of the mirror filter. One example of the manner in which a "mirror-stolen" packet can be forwarded to a network appliance is provided in a co-pending, commonly assigned U.S. patent application Ser. No. 11/712,706, entitled, "Packet Tunneling", by inventors Bruce LaVigne, et. al., filed Mar. 1, 2007, which is incorporated in full herein. The same is not described more fully herein so as not to obscure embodiments of the present invention.

The network appliance 250-1 may chose to drop a suspicious packet received from the mirror-stealing operation. However, if a packet passes the checking functionality applied by the network appliance 250-1, e.g., is "cleared", the logic of the network appliance will securely tunnel encapsulate the packet and can forward the packet to the originating switch, e.g., switch 218-1. One example of the manner in which the logic of the network appliance can securely tunnel encapsulate the packet and forward the packet to the originating switch is provided in a co-pending, commonly assigned U.S. patent application Ser. No. 11/788,179, entitled, "Marked Packet Forwarding", by inventors Bruce LaVigne, et. al., filed Apr. 19, 2007, which is incorporated in full herein. The same is not described more fully herein so as not to obscure embodiments of the present invention.

Upon arrival at the originating switch, this switch may re-forward the packet to be sent out ports to which the packet had previously been denied. One example of the manner in which an originating switch, e.g., 218-1, may forward a returned "mirror-stolen" packet to be sent out ports is provided in a co-pending, commonly assigned U.S. patent application Ser. No. 11/784,664, entitled, "Locating Original Port Information", by inventors Bruce LaVigne, et. al., filed Apr. 9, 2007, which is incorporated in full herein. The same is not described more fully herein so as not to obscure embodiments of the present invention.

According to embodiments of the present invention, the cleared packet is not allowed to go to all possible destinations, since the member ports would then receive a duplicate packet. To prevent this from occurring, the logic determines that the packet has been returned from a CF by examination of fields within the encapsulation header of the packet, e.g., the source and destination IP addresses as well as other fields necessary to correctly identify the packet, these fields being chosen depending on the type of encapsulation in use (e.g., TCP/UDP port numbers, GRE key field, etc.).

Figure 5A:
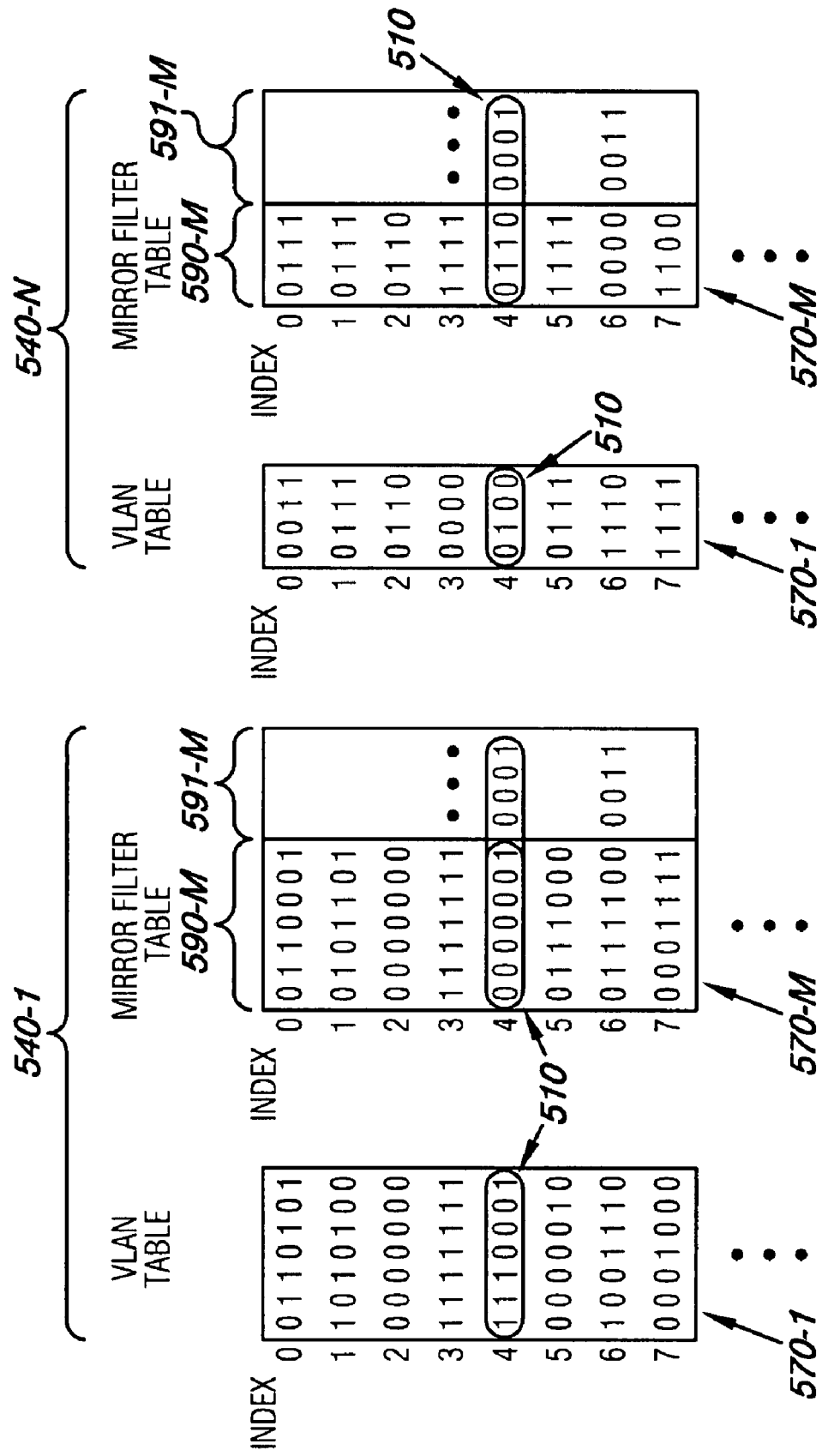
FIGS. 5A-5D illustrates logical operations on indexed filters, e.g., port masks, according to embodiments of the present invention.
Figure 5B:
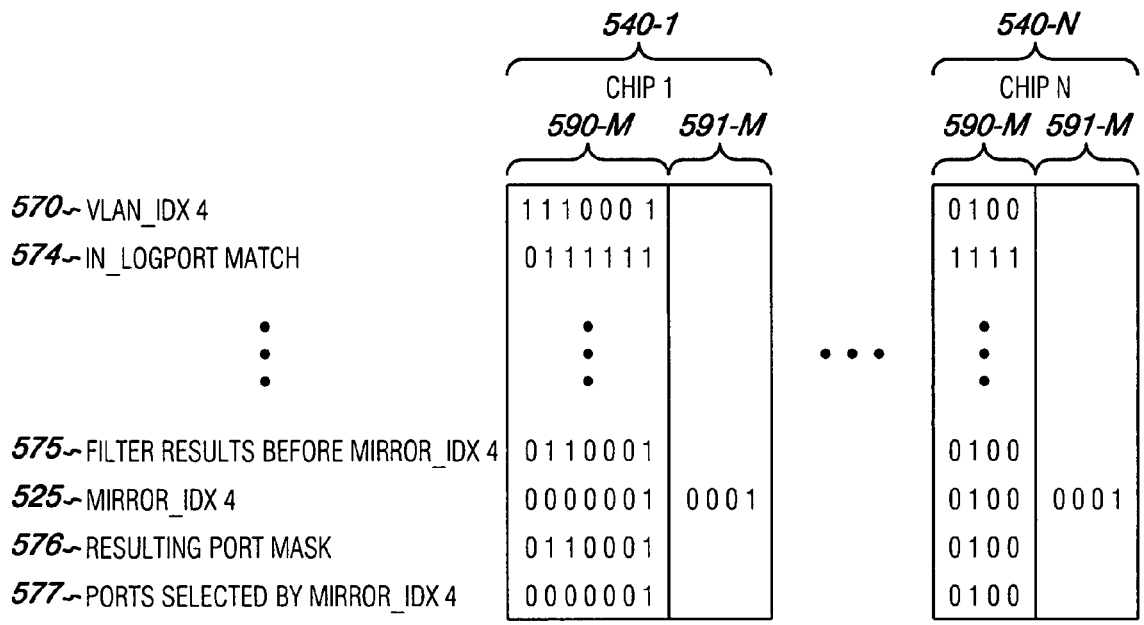
Figure 5C:
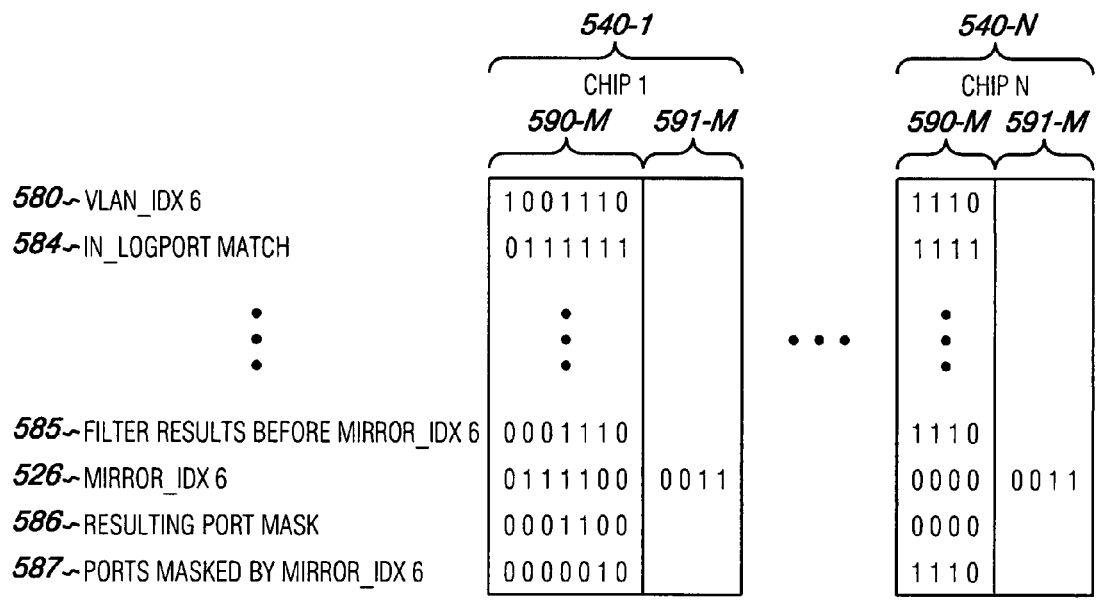
Figure 5D:
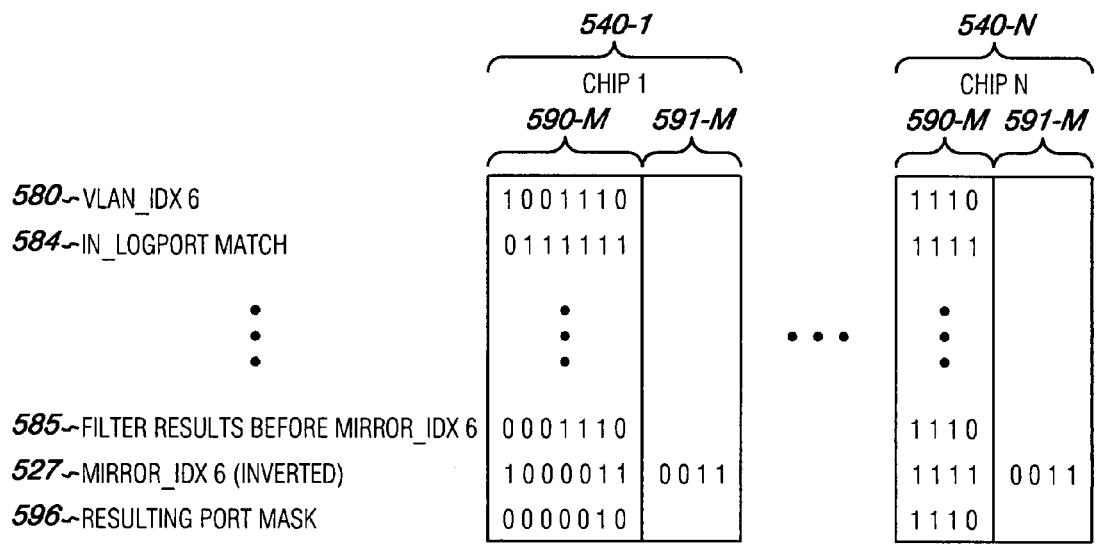
Figure 6A:
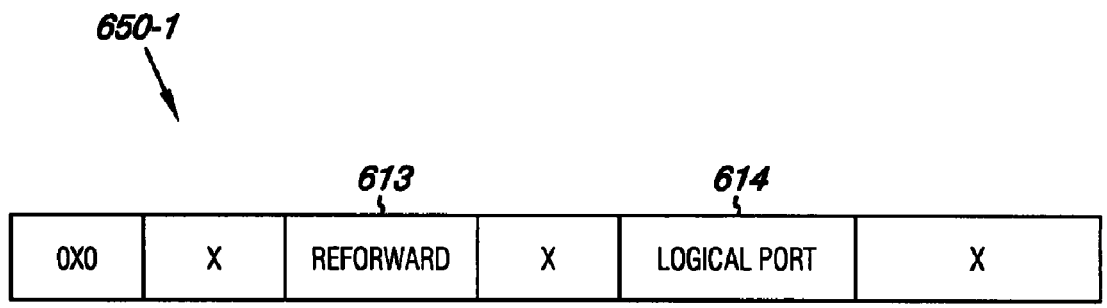
FIGS. 6A-6B illustrates an embodiment of a buffer request command.
Figure 6B:
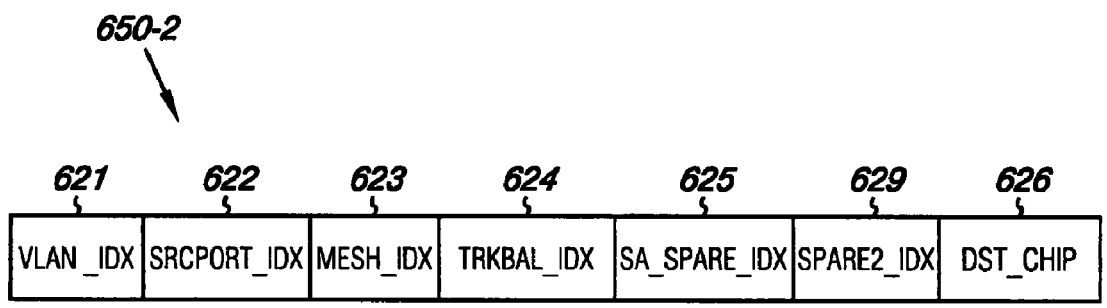

Once the logic has identified that the packet has been sent from a CF, e.g., network appliance 250-1, to the originating switch 218-1, it can indicate that the packet is being "re-forwarded" by setting a REFORWARD status bit, e.g., bit field 613 in FIGS. 6A-6B. Additionally, egress logic on the receiving chip (e.g., fabric receiver 460 described in connection with FIG. 4) may reapply the same mirror filter index originally used to detect that the packet was to be mirror-stolen. As described in more detail in connection with FIGS. 5A-5D, the egress logic on the receiving chip may operate, using a filter value (port mask), to prevent the packet from being allowed to go to ports having already received the packet.

Thus, according to embodiments of the present invention, packets may be selectively chosen for tunneling to the CF (e.g., network appliance 250-1 in FIG. 2) based on a mirror filter. As the reader will appreciate, in existing network chip logic packets may be egress-mirrored on the port or VLAN, causing a copy of the regressing packet to be sent to the mirror destination, e.g., network appliance 250-1 in FIG. 2. Again, "mirror-stealing" a given packet means copying the packet, forwarding the copied packet to a mirror destination, and preventing the packet from being sent out certain ones of the original port(s) to which it would normally be sent. As explained in further detail below, the present embodiments extend this capability by using a mirror filter to enable mirror stealing on a per port per VLAN basis. That is, logic operates on a mirror filter to selectively choose packets for forwarding to a CF, e.g., 250, on a per port per VLAN basis. A CF 250 may then decide to re-forward the packet out of the original port(s) if the packet passes whatever checks, e.g., security checks, the CF 250 performs.

According to embodiments, if a mirror bit in a mirror filter indicates a mirror and/or steal action, the logic is operable to perform the directed action and set a bit, e.g., an "OUT_MIRROR" bit status in the Buffer Reply (e.g., bit field 714 as described in connection with FIGS. 7A-7B), the port(s) may be "masked" (as described below in connection with FIGS. 4-5C) from an outgoing port list. According to embodiments, in order to allow these packets to be easily re-forwarded by the CF, e.g., 250, a "REFORWARD" bit status is set when a packet arrives back from the CF and sent in the buffer request (e.g., bit field 613 in FIG. 6A).

Embodiments of the present invention build upon earlier patented work disclosed in U.S. Pat. No. 7,103,045, which is commonly assigned, entitled, "System and Method for Forwarding Packets", by inventors Bruce LaVigne, et. al., and which issued Sep. 5, 2006. The same is incorporated herein by reference. As described in the above patent, packets are processed on ingress to determine a number of filter indices, which are then used on egress to determine exactly to which port(s) the data packet traffic should go. Further example of the same is provided next in connection with FIGS. 4-5C.

Figure 3:
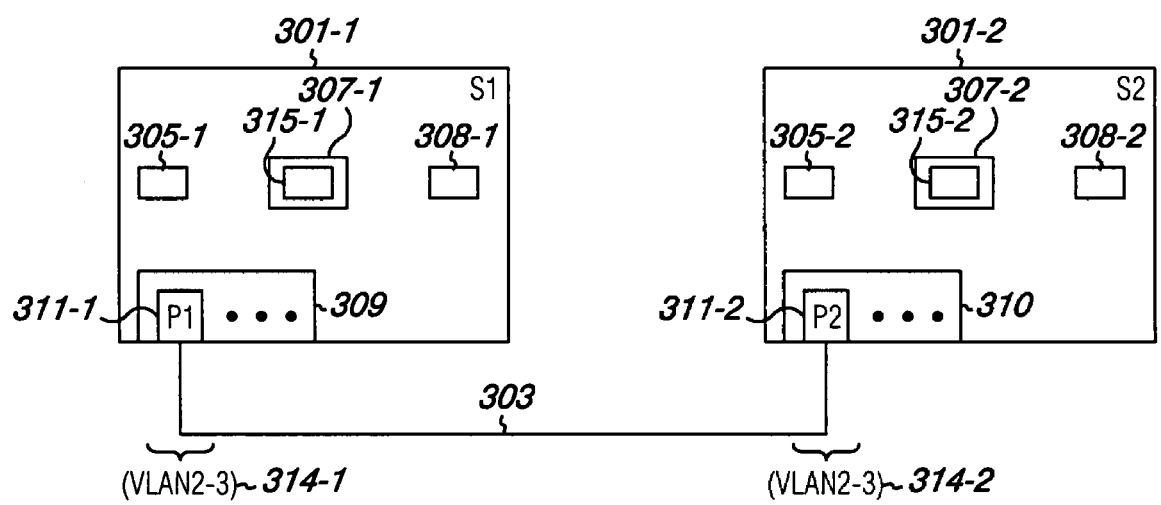
FIG. 3 illustrates an embodiment of ports having membership in multiple VLANs.

FIG. 3 illustrates an embodiment of ports having membership in multiple VLANs. The embodiment of FIG. 3 illustrates a pair of switches (S1 and S2), 301-1 and 301-2, respectively, connected via a physical link 303 as can exist within a network such as the network shown in FIG. 1. As shown in FIG. 3, the switches 301-1 (S1) and 301-2 (S2) include processor and memory resources, 305-1/307-1 and 305-2/307-2 respectively, and logic circuitry associated with a network chip (ASIC), e.g., 309 and 310, each having a number of physical ports, e.g., 311-1, ..., 311-2, etc.

In the embodiment shown in FIG. 3, a port 311-1 (P1) on a switch 301-1 (S1) has a physical link connection 303 with a port 311-2 (P2) of switch 301-2 (S2). As shown in the example embodiment of FIG. 3, port 311-1 (P1) of switch 301-1 (S1) has membership in both VLANs 2 and 3, and port 311-2 (P2) of switch 301-2 (S2) also has membership in both VLANs 2 and 3. That is, a first port (P1) on a first network device (S1) has been assigned membership in a first VLAN, e.g., VLAN 2, and a second VLAN, e.g. VLAN 3, and a second port (P2) on a second network device (S2) has been assigned membership in a first VLAN, e.g. VLAN 2, and a second VLAN, e.g., VLAN 3. One of ordinary skill in the art will appreciate upon reading this disclosure the manner in which various ports, e.g., port 311-1 (P1) and port 311-2 (P2), associated with a given switch, e.g., switch 301-1 (S1) and switch 301-2 (S2) may be assigned membership in a particular VLAN. For example, a particular port may be assigned in a particular VLAN by execution of software, firmware, and/or user, e.g., network administrator, physical configuration.

Such VLAN assignment may also occur on ports that are trunked (or aggregated) between devices. Trunking is a method of aggregating links together to form a more redundant link with larger bandwidth, and results in all ports that form the trunk being made members of all VLANs originally assigned to the ports that now form the trunk. An aggregate link, also known as a "trunk", is formed either manually or dynamically. A manual trunk comes into existence when a network administrator physically configures ports on multiple network devices to be trunk members, or uses an automated protocol such as link aggregation control protocol (LACP), which is a standard in IEEE 802.3ad. In addition, a dynamic trunk can come into existence when an administrator has previously configured multiple network devices to support "dynamic" LACP, and when two or more links are connected between the switches. LACP may be implemented by executable instructions as part of a LACP engine located on a switch, e.g., 308-1 and 308-2 as shown in FIG. 3, as the same will be known by one of ordinary skill in the art.

According to embodiments of the present invention, logic is provided to switches 301-1 and 301-2 which is operable to apply a mirror filter port mask and to direct a particular mirror action be performed on packets on a per port per VLAN basis, regardless of whether ports 311-1 (P1) and 311-2 (P2) are members of trunks or not.

Figure 4:
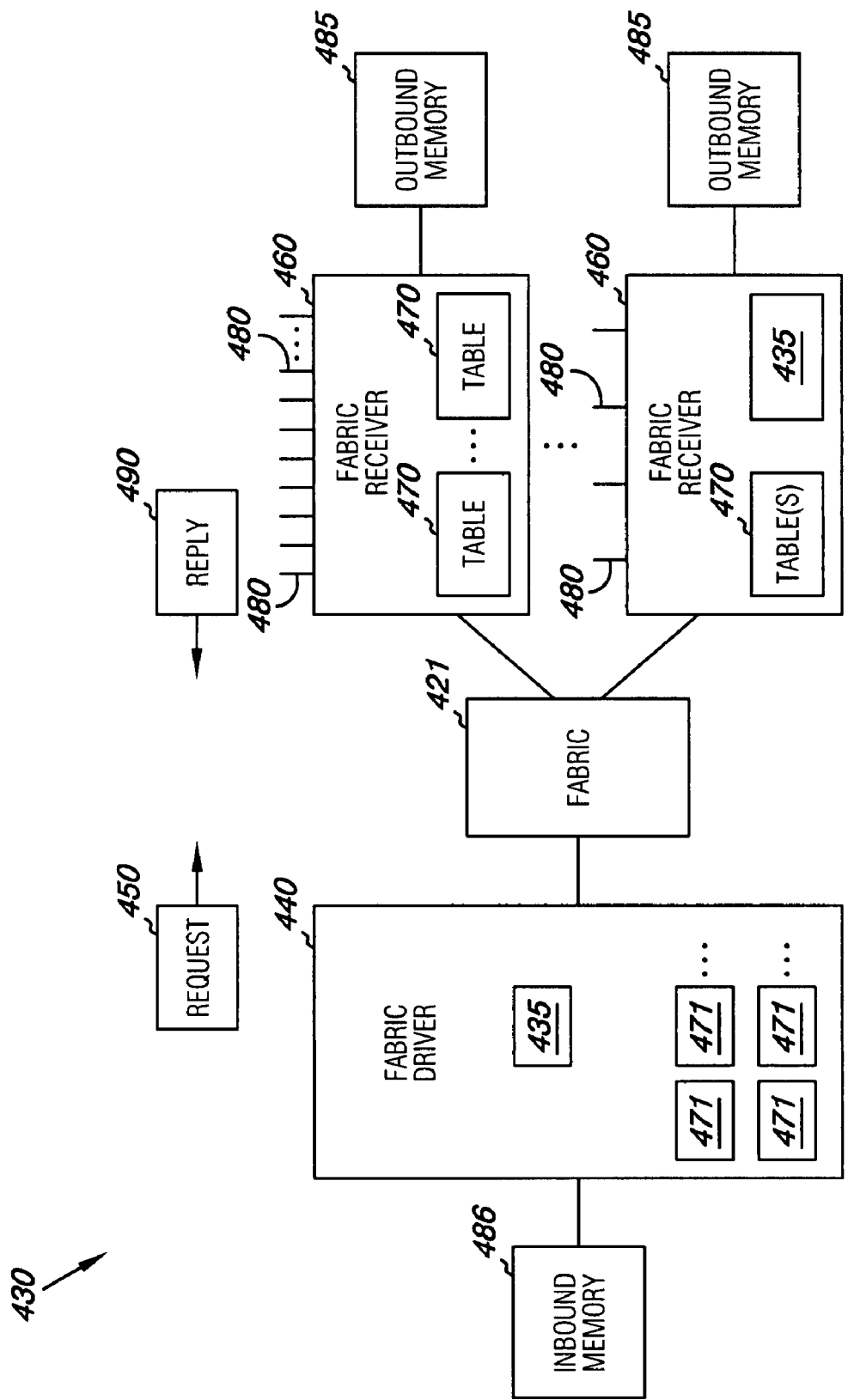
FIG. 4 is another block diagram embodiment logically illustrating components within a network device, such as network devices shown in FIG. 2.

FIG. 4 is a block diagram embodiment logically illustrating components within a network device, such as network devices, e.g., 218-1, shown in FIG. 2. The embodiments of FIG. 4 represents logically the components on the network chips themselves, e.g., 240-1, ..., 240-N in FIG. 2, as well as within the crossbar fabric, e.g., fabric (F) 421 of FIG. 4 and crossbar fabric 239-1, ..., 239-N in FIG. 2. As explained in connection with FIG. 2, a given network device 218-1 may have a number of network chips, e.g., 240-1, ..., 240-N, resident thereon. The fabric 421 of FIG. 4 includes the logic to forward packets between the number of network chips, 240-1, ..., 240-N, on the given network device 218-1.

In the embodiment of FIG. 4, the logical components 430 include hardware in the form of ASICs. As shown In FIG. 4 a fabric driver, 440 (e.g., "first logical component") includes logic on a given network chip that creates a buffer request 450 for buffer space when it has a packet that is to be forwarded on one or more ports 480 of a given network chip, e.g., ports 220-1, ..., 220-P in FIG. 2.

As shown in FIG. 4, the buffer request 450 is sent to a fabric receiver, 460 (e.g., "second logical component") on a given network chip that has one or more ports 480, e.g., ports 220-1, ..., 220-P in FIG. 2, to which the packet is to be forwarded. The buffer request 450 contains a number of filter indices for specifying packet forwarding criteria. As one of ordinary skill in the art will appreciate, the fabric driver 440 also specifies values for the filter indices on the packet to be forwarded. The values of the filter indices can be derived from packet information such as VLAN information, source address information, destination address information, ingress port information, egress port information, etc., as shown in connection with FIGS. 5A-5D. As one of ordinary skill in the art will appreciate, the fabric receiver 460 associated with a given network chip will be associated with a number of network port(s) 480, e.g., ports 220-1, ..., 220-P in FIG. 2.

Upon receiving a packet at inbound memory 486 to be forwarded on one or more ports 480, the fabric driver 440 creates the buffer request 450 to reserve space in the outbound memory 485. The number of ports 480 is coupled to outbound memory 485 in which the fabric driver 440 is requesting space for the packet. The fabric receiver 460 has filter tables 470 that specify which of the ports 480 are to receive the packet based on the filter values. The fabric receiver 460 determines which of the ports 480 are to receive the packet based on the filter table information and the filter values as described further in connection with FIGS. 5A-5D.

The filter indices in the buffer request 450 may be determined by the fabric driver 440 or by other logic (not shown). The filter indices may provide a way to limit which ports 480 receive the packet, without necessarily specifying the port(s) 480 in the buffer request 450. The filter indices may define which ports 480 are to receive the packets on criteria, such as, for example, VLAN membership information, multicast group membership information, logical port information, trunk forwarding information, etc. The present invention is not limited to the filter indices described herein and is well suited to developing additional filter indices for some parameters that may affect forwarding decisions, such as, for example, Ethernet type, IP protocol, etc.

According to embodiments of the present invention, a "mirror filter table", e.g., 570-M in FIG. 5A, can be indexed using the same index derived from a VLAN index bit field, e.g. VLAN_IDX 621 in FIG. 6B. The mirror filter table is purposefully defined and used in association with network packets to indicate a particular mirror filter action on a per port per VLAN basis. Embodiments, however, are not limited to this example of a mirror filter table being indexed using an index derived from a VLAN index bit field. Other index bit fields may alternatively be used to derive an index to the mirror filter table. Once filter indices reach the egress logic of a given chip they are configured to logically apply the mirror filter value (port mask) as referenced by the VLAN index. In some embodiments, the egress logic applies the mirror filter value (port mask) from the mirror table, e.g., 570-M in FIG. 5A, as referenced by the VLAN index, last after other filter values have been logically operated on. An example embodiment of applying the mirror filter value in this manner, e.g., as referenced by the VLAN index, is provided in FIGS. 5A-5D.

As explained in the example embodiment of FIGS. 5B-5C, if any port is filtered out due to use of the mirror filter on a per port per VLAN basis, then logic can operate to perform different mirroring actions on a particular port on different VLANs and/or perform different mirror actions, e.g., mirror particular packets to particular destinations, mirror-steal particular packets to different destinations, etc., on a per port per VLAN basis. That is, packets may be mirrored, mirrored-stolen, etc., and sent to one or more different checking functionalities in one or more different locations, e.g., CFs 250-1, 250-2, 241, 260, 265, 266, 270, etc in FIG. 2. In this manner multiple checking functionality actions may be taken and differentiated on a per VLAN basis for a particular port.

If the checking functionality is an intrusion prevention system (IPS) or similar device, the checking system may chose to allow the packet to be forwarded after the packet passes any checks. In some embodiments, a packet can avoid being duplicated on a particular port by indicating the packet is being re-forwarded (e.g., setting a status bit in field 613 of FIG. 6A), along with re-using the same filters (e.g., mirror filter table value associated with the index derived from VLAN bit field VLAN_IDX 621 in FIG. 6B).

By using filter indices to specify forwarding criteria, the fabric driver 440 need not explicitly specify or even know the ports 480 that are to receive the packet(s). For example, the fabric driver 440 need not know which ports 480 are on a particular VLAN, only that whatever ports 480 are on the particular VLAN are to receive packet(s).

As shown in FIG. 4, the fabric receivers 460, which may be coupled to the fabric driver 440 via fabric logic 421, include one or more filter tables 470 containing port masks, shown in FIGS. 5A-5D. The fabric receivers 460 include logic to determine which ports 480 are to receive the packet on the filter indices in the buffer request 450 and information in the filter table(s) 470. In this manner, the number of ports 480 on fabric receivers 460 can be changed over time without the fabric driver 440 needing to know about all the ports 480 on the receiver side. Furthermore, as noted above, not all fabric receivers 460 need have the same numbers of ports 480 and the ports 480 may have different characteristics, including different membership in some mirror filters, different transmission rate capabilities (e.g., 10/100/1000 Mbit/sec., etc.). While the fabric driver 440 and fabric receivers 460 have been described above and are illustrated in FIG. 4 as separate blocks, they may be on the same physical component.

FIGS. 5A-5D illustrate logical operations on indexed filters, e.g., port masks, according to embodiments of the present invention. FIG. 5A illustrates filter tables within fabric receivers, e.g., filter tables 470 in fabric receivers 460 as described in connection with FIG. 4. FIGS. 5B and 5C illustrate embodiments for original packet buffer request processing, such as processing the buffer request with the mirror bit portion 590-M of the mirror filter value (port mask) 510 in FIG. 5A in the mirror filter table 570-M, as referenced using the VLAN filter index, e.g., VLAN_IDX 621 in FIG. 6B. As mentioned above, embodiments are not limited to using the same index as the VLAN filter index shown in this example. FIG. 5D illustrates an embodiment for processing a buffer request for a reforwarded packet, based on the REFORWARD flag being set, e.g. REFORWARD 613 in FIG. 6A.

FIG. 5A illustrates a filter table embodiment of port masks according to the present disclosure. As described in connection with FIG. 4, each of the fabric receivers 460 associated with a particular chip may have one or more filter table(s) 470 for each filter in the buffer request 450, although a filter table 470 may be used for more than one filter. FIG. 5A shows filter tables 570-1, . . . , 570-M, including a VLAN filter table, a MIRROR filter table, etc., for chip 540-1 and shows filter tables 570-1, . . . , 570-M, including a VLAN filter table, a MIRROR filter table, etc., for chip 540-N. Each filter table, 570-1, . . . , 570-M, on a given chip may contain a filter value (e.g., "port mask") 510 for each filter index, e.g., index rows 0-7 shown in this example embodiment.

As used in the example embodiment of FIGS. 5A-5D the designator "M" represents that each fabric receiver, 460, associated with a given chip, 540-1, . . . , 540-N, may contain a number of filter tables for some numbers of filters associated with the given chip. The number of filter tables associated with one fabric receiver may be different from the number of filter tables associated with another fabric receiver. As the reader will appreciate, the designator "N" represents that a number of network chips may be provided to any given network device, e.g., switch 218-1 in FIG. 2. The number designated by M may be more or fewer than the number designated by N.

Each port mask 510 may have a bit for each port 480 which the particular fabric receiver 460 supports. Having a bit set may mean that the corresponding port 480 should receive a packet for the criteria specified by the filter index. For example, if the filter index is associated with VLAN membership, a bit in the port mask 510 is set corresponding to each port 480 that is a member of the VLAN, e.g., VLAN 2 and/or VLAN 3 in the example embodiment of FIG. 3. In the embodiment of FIG. 5A, filter tables 570-1, . . . , 570-M associated with chip 540-1 are shown representing seven bits to a port mask 510. For ease of illustration, this could represent the first seven bits of a port mask 510 with the remaining bits not shown so as not to over clutter the drawing. If, for example, there were 24 ports 480 associated with the fabric receiver of chip 540-1, there could be a 24 bit port mask 510, etc., in the filter tables 570-1, . . . , 570-M associated with chip 540-1.

FIG. 5A illustrates two example filter tables, e.g., a VLAN filter table and a MIRROR filter table, associated with two different chips, 540-1 and 540-N, to demonstrate how the bit port masks 510 may function. In operation, the fabric driver 440 in FIG. 4 creates a buffer request 450, also shown in more detail as 650-1 and 650-2 of FIGS. 6A and 6B. As shown in FIGS. 6A and 6B, the buffer request may contain a bit field pointer, e.g., a VLAN filter index VLAN_IDX 621, from which a VLAN filter value (port mask) can be derived. The buffer request may also contain a bit field, e.g., a source port filter index SRCPORT_IDX 622, from which a SOURCE PORT filter value (port mask) can be derived. The filter indices contained in the bit fields, e.g., 621 and 622, will be used to index into each filter table, respectively, to return a filter value (port mask). For example, in FIG. 5A a circle surrounds a VLAN filter value (port mask) 510 corresponding to an index (VLAN_IDX) of 4 in association with the VLAN filter table 570-1 of chip 540-1. In some embodiments, as explained in more detail below, this same index 4 will be applied to a MIRROR filter table 570-M to produce a mirror filter value (port mask) 510. Additionally, in some embodiments, as will be explained in more detail below, the mirror filter value (port mask) 510 associated with each index in the mirror filter table 570-M includes a first portion 590-M to the port mask 510 having a bit association for each port, 480 in FIG. 4, and a second portion 591-M to the port mask 510 having one or more bits which serve as an action selector, e.g., which indicate a particular action to be applied to a given packet.

For example, the embodiment of FIG. 5A illustrates the MIRROR filter table at index 4 having a bit value per port per VLAN, e.g., a bit value per port and per VLAN as represented in portion 590-M of port mask 510, such that where ports are members of multiple VLANs the logic will only take action on packets received from a particular port which are also on a particular VLAN, e.g., port P1 on VLAN 2. Thus, embodiments can operate on packets on a per port per VLAN basis. Further, the embodiment of FIG. 5A illustrates the MIRROR filter table at index 4 illustrates the port mask 510 having one or more bits which serve as an action selector, i.e., portion 591-M, to indicate a particular action to be applied to a given packet, e.g., mirror, mirror-steal, etc., on the per port per VLAN basis. Hence, some embodiments can further accord different mirroring actions for packets according to a per port per VLAN basis. In this manner, packets sent to the same port can have different mirroring actions applied thereto as differentiated by a given packets membership in different VLANs. The different actions can include mirroring, mirror-stealing, and/or mirroring/mirror stealing conditioned on other criteria, to one or more different types of checking functionalities in one or more different locations, as the same have been described above in connection with FIG. 2.

As the reader will appreciate, after receiving a particular buffer request, e.g., 450 in FIG. 4, a fabric receiver, e.g., 460 in FIG. 4, applies logic to index a respective port mask within filter tables 570-1, . . . , 570-M associated with a given chip, e.g., 540-1 and 540-N, may perform a logical AND of index results (port masks). For example, using index 4 in association with VLAN filter table 570-1 associated with chip 540-1 produces a port mask 510 of "1110001", e.g., for the first seven bits of what could be a twenty-four bit (24-bit) mask, etc. According to embodiments, the logic will index MIRROR filter table 570-M using the same index of 4 in association with the same chip 540-1 to produce a port mask 510 of "0000001" for the first seven bits of what could be a 24-bit (or fewer or greater) port mask, associated with a port bit setting portion 590-M of the mirror filter value (port mask) 510. Performing a logical AND of these two port masks 510 produces a value of "0000001", indicating that the packets destined to the seventh port from the left should have some action applied thereto.

As described above, the filter value associated with index 4 in the MIRROR filter table 570-M, may also have an action field indicator portion 591-M to the mirror filter value (port mask) 510 reflected as one or more bits which identify a particular action to be taken, e.g., mirroring, mirror-stealing, and/or mirroring/mirror stealing conditioned on other criteria. As shown in the embodiment of FIG. 5A, chip 540-N, may be indexed with the same filter index, e.g., 4, or may be indexed with a different index value on a per chip basis. Embodiments are not limited to the index example of FIG. 5A. Applying an index to filter tables associated with chip 540-N will produce filter values in a manner analogous to that described in connection with chip 540-1. The fabric receivers 460 may perform this operation in parallel and independent of each other in the case that multiple fabric receivers are processing buffer request commands 450.

As shown in FIG. 4, the fabric driver 440 also may have one or more filter tables 471 containing information for specifying which of the fabric receiver(s) 460 are to receive the buffer request command 450 on the filter indices. The fabric driver 440 may index these filter table(s) 471 with the filter indices and may perform a logical operation on the index result values (port masks) to determine which fabric receiver(s) 460 are to receive the buffer request command(s) 450. In this fashion, the fabric driver 440 may also be able to limit to which fabric receivers 460 it sends buffer request commands 450. In this manner, logic can operate to apply filter values (masks) on a per port per VLAN basis produced by indexing a MIRROR filter associated with a port a given packet is received on and/or according to a particular port the packet is destined to and can have different mirror actions applied to such packets based on a particular mask. Embodiments of the present invention are not limited to any particular number of filter tables and/or filter indices used in performing such a logical AND operation on the results from indexing a certain group of such filter tables.

According to embodiments, as described further in connection with FIGS. 5B and 5C, a particular sequence of logical AND operations may be applied to filter values (port masks) from various filter tables. The number of ports 480 to receive a given packet may be limited to any suitable degree by selection of particular filter values (e.g., "port masks"). As the reader will appreciate, embodiments are not limited to combining the results from indexing particular filter tables by performing a logical AND, other logical operations may additionally be used.

Figure 7A:
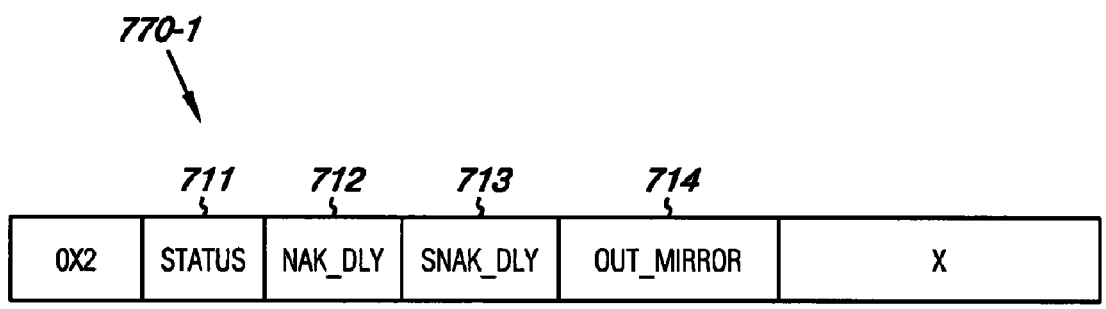
FIGS. 7A-7B illustrates an embodiment of a buffer reply command.
Figure 7B:
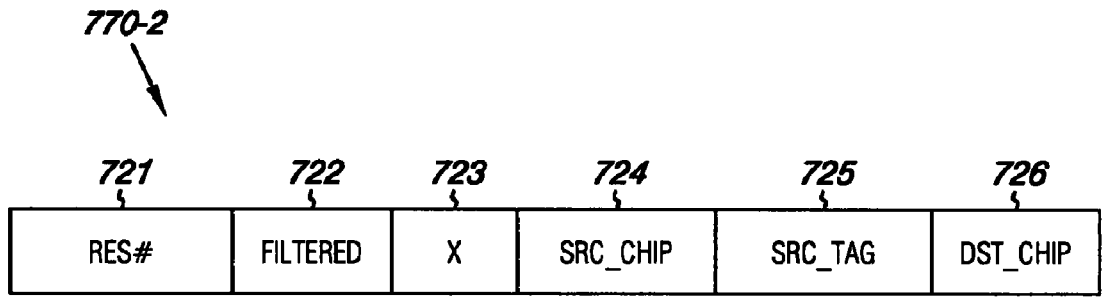

As described above, the fabric receiver 460 associated with a given network chip, e.g., 540-1, . . . , 540-N, will generate a buffer reply 490, shown as 770-1 and 770-2 of FIGS. 7A and 7B, containing a bit field, e.g., 714 in FIG. 7A, which indicates whether a particular packet belongs to a "per-egress mirror group" and other fields in the buffer reply, such as 711 indicate whether fabric driver 440 should send the packet(s) to one or more ports 480 coupled to the fabric receiver 460. As used herein, a "per-egress mirror group" means a particular mirror filter, and that mirror filters have been designated to mirror, mirror-steal, etc., packets to a checking functionality.

Hence, a per-egress mirror group membership can be defined per port per VLAN based on the mirror filters and associated action fields defined therein. The mirror filters can make use of a filter index derived from a VLAN filter bit field, e.g., VLAN_IDX 621 in FIG. 6B, associated with a given packet.

As described in more detail below, if the MIRROR filter table value, e.g., 510 in FIG. 5A, associated with a given port and a given VLAN includes a selection indicator portion 591-M, then the action taken on a given packet on a per port per VLAN basis can also be differentiated between ports on the same VLAN. That is, the logic can use the action selector portion 591-M of the port mask 510 to differentiate a particular mirror action, additional condition, and/or particular mirror destination, e.g., apply regular mirroring, apply mirror-steal, and/or apply a mirror action additionally conditioned upon a criteria such as IP flow, etc.

In some embodiments, when a mirror action is to be applied to a packet on a per port per VLAN basis, the logic will set one or more bits in an OUT_MIRROR bit field (714 in FIG. 7A) in the buffer reply, e.g., 770-1 and 770-2 as shown in FIG. 7A-7B. By application of the embodiments of the present invention, such designated ports (or individual port members of a trunk) or VLANs can now be mirrored with the greater specificity of a per port per VLAN membership basis and even differentiated to the level of different mirror actions based on VLAN membership of the packet received from or destined to the same port.

In this example embodiment, an ACL lookup can be configured to derive the VLAN filter index for a packet (e.g., VLAN_IDX 621 in FIG. 6B) on the ingress port of the packet. That is, if an ACL lookup is configured to set VLAN_IDX 621 bit field on ingress port, then this packet would have a VLAN_IDX filter mask associated with one or more particular ports and one or more particular VLANs even if the same had been trunked with other ports and VLANs.

As described in connection with FIGS. 4 and 5A, when the various filter indices are being processed a certain number of filter tables, e.g., including VLAN membership, SOURCE-PORT information, multicast information, etc., for the flooded packet may result in ports or VLANs being set for packet receipt. However, according to embodiments, a VLAN_IDX filter index would also be used as a filter index which subsequently indexes to the MIRROR filter table to port mask and mirror only a particular subset of packets on a per port per VLAN basis. For example, packets received from or destined to port P1 which also have membership in VLAN 2 may be the only packets designated to have a mirror action applied thereto, e.g., to be mirror-stolen to a checking functionality.

According to embodiments, logic in the fabric receiver, e.g., 460 in FIG. 4, can detect whether a particular packet received by a particular port, e.g., P1 311-1, and belonging to a particular VLAN, e.g., VLAN 2, has been configured to be egress mirrored using the VLAN index, e.g., VLAN_IDX 621 in FIG. 6B, applied to the MIRROR filter table. If so the logic will set one or more bits in an OUT_MIRROR bit field (714 in FIG. 7A) in the buffer reply, e.g., 770-1 and 770-2 as shown in FIG. 7A-7B, to mirror only packets matching that criteria. That is, the logic will set the OUT_MIRROR bit field (714 in FIG. 7A) in a manner which indicates that the packet is to have a mirror action applied thereto. The logic, however, will not designate packets received from or destined to other ports and having membership in other VLANs to have a mirror action applied thereto. Logic in the fabric driver 440 will then only apply a mirror action, e.g., mirror packets to the checking functionality, based on the OUT_MIRROR bits set in the reply (714 in FIG. 7A).

To mirror steal such packets to the checking functionality, the logic can copy the packet and then may encapsulate the packet, e.g., using generic routing encapsulation (GRE), etc, to send the copied packet to the checking functionality. Other encapsulation techniques include Ethernet-within-IP (RFC3378), Layer 2 Tunneling Protocol (L2TP-RFC3931), etc. In some embodiments the logic will encapsulate and secure tunnel the packet to a network appliance located elsewhere in the network, e.g., 250-1 in FIG. 2. In alternative embodiments, the logic can copy the packet and forward the packet to a checking functionality local to the network device as described in connection with FIG. 2.

The checking functionality may then check the packet and decide whether the packet is OK to be sent out ports. As the reader will appreciate the checking functionality can also drop the packet if the packet is not approved. If the checking functionality approves the packet, the checking functionality can optionally re-encapsulate the network packet and send it back to the originating device where it is flagged for a re-forwarding operation, e.g., by setting the REFORWARD flag 613 in the newly generated buffer request 450.

FIG. 5B illustrates a first embodiment for original packet buffer request processing, e.g., processing of buffer request 450 in FIG. 4. FIG. 5B illustrates a number of filter indices, e.g., VLAN_IDX 4 (570), IN_LOGPORT MATCH (574), etc., having an associated port mask for each fabric receiver, e.g. network chips 540-1, 540-2, 540-3, . . . , 540-N. Any number of filter values may be indexed ("IDX") as described in connection with FIG. 5A. As described above a logical AND operation can be performed on the port masks associated with a first particular group of filter indices, e.g., VLAN masks, port masks, etc., to produce filter results 575 before including the mirror table filter value 525, e.g., associated with MIRROR_IDX 4. In this case, the action specified by the action field indicator (591-M) for MIRROR_IDX 4 (0001) is interpreted to mean a simple mirror-only operation. According to this embodiment, the resulting port mask 576 is identical to the filter results before MIRROR_IDX 4 (575). For example, logically speaking filter results 575=570 AND 574 AND (any other filter port masks); 576=575; 577=575 AND 525; OUT_MIRROR=|577 (wherein "|" represents a bit-reduction OR, i.e., results in a "1" if any bit is set in 577).

As shown in FIG. 5B if any ports are selected by the mirror filter 525 (MIRROR_IDX 4) the buffer reply will return an OUT_MIRROR bit (714 in FIG. 7A). This is illustrative of a traditional mirror operation, as is known to those of ordinary skill in the art, with the exception that packets are selected for mirroring on a per-port per-VLAN basis.

FIG. 5C illustrates a second embodiment for original packet buffer request processing, e.g., processing of buffer request 450 in FIG. 4. This is similar to the example shown in FIG. 5B, except in this case the VLAN in question is VLAN 6, resulting in VLAN_IDX 6 (580) and MIRROR_IDX 6 (526). In this case, the action specified by the action field indicator (591-M) for MIRROR_IDX 6 (0011) is interpreted to mean a mirror-steal operation. According to this embodiment, another logical AND operation is subsequently performed on the result from all the earlier port masks, now including the port mask resulting from the mirror filter 526 (MIRROR_IDX 6), to produce resulting port mask 586. For example, logically speaking filter results 585=580 AND 584 AND (any other filter port masks); 586=585 AND 526; 587=585 AND (NOT 526); OUT_MIRROR=|587 (wherein "|" represents a bit-reduction OR, i.e., results in a "1" if any bit is set in 587). As can be seen from ports masked by MIRROR_IDX 6 (587), the packet has now been prevented from being sent to port 6 on chip 1 (540-1) and also from ports 1, 2 and 3 on chip N (540-N), and has also been flagged using OUT_MIRROR for a mirror operation.

As noted above, the designated action taken on a particular packet could include designating the packet for a regular mirroring action, a mirror-stealing action, and/or a mirror action based on some further criteria, etc., to one or more different mirror destination which can be associated with one or more different checking functionalities.

FIG. 5D illustrates an embodiment for re-forwarded buffer request processing, e.g., processing of a buffer request 650-1 and 650-2 where the REFORWARD flag 613 is set. As in FIG. 5C, FIG. 5D illustrates a number of filter indices, e.g., VLAN_IDX 6 580, IN_LOGPORT MATCH 584, etc., having an associated port mask for each fabric receiver, e.g. network chips 540-1, 540-2, 540-3, . . . , 540-N. Again, a logical AND operation can be performed on the port masks associated with a first particular group of filter indices to produce filter results 585 before including the mirror table filter value. Logic on the receiving network chip will then invert the mirror table filter value (port mask) 526 (MIRROR_IDX 6 from FIG. 5C) to produce "inverted" mirror table filter value (port mask) 527 (MIRROR_IDX 6 INVERTED).

The inverted MIRROR_IDX 6 value (port mask) then undergoes another logical AND operation along with the filter results 585 from the other filter indices, e.g., 580 and 584. This subsequent logical AND operation produces a resulting port mask 596 (e.g., "port mask") which will allow the re-forwarded packet to only go to ports which have not already received the packet. In this example, the resulting port mask 596 will allow the re-forwarded packet to be sent to port 6 on chip 1 (540-1) and ports 1, 2 and 3 on chip N (540-N), to which the packet had previously been denied. Using the resulting port mask 596, the logic will additionally prevent the packet from going to ports 4 and 5 on chip 1 (540-1), which are now filtered, but which had previously sent the packet (as described previously and shown in FIG. 5C).

As such, different resulting ports can be masked in order to have a different action be taken, e.g., different mirroring, mirror-stealing, and/or mirroring/mirror-stealing conditioned on some additional criteria, etc., on packets on a per port per VLAN basis, while differentiating between ports on the same VLAN, e.g., applying a number of different mirror actions according to one or more different checking functionality types present in one or more different locations.

FIGS. 6A-6B illustrates an embodiment of a buffer request command, e.g., buffer request command 450 in FIG. 4. FIGS. 6A-6B form one buffer request command, shown as 650-1/650-2. In the embodiments shown in FIGS. 6A-6B, the two buffer request commands, referred to collectively as 650, may both be sent as a part of a single exchange. However, the present invention is not limited to using two buffer request commands 650 per exchange. For example, the format of the buffer request command 650 may allow all information to be passed in a single buffer request command, or it may be spread across more than two commands.

In FIG. 6A the first half 650-1 of the first buffer request command can include a re-forward status bit field, e.g., REFORWARD bit field 613, which may be one or more bits, to indicate that a packet associated with the buffer request command is being re-forwarded, as described above and in reference to the operation of FIGS. 5A-5D. The first half 650-1 of the buffer request command 650 has a LOGICAL PORT field 614, i.e., containing logical port information, which may be for logical port number and may allow certain traffic to be stopped, for example, if the source equals the destination.

In FIG. 6B the second half 650-2 of the buffer request command 650 includes the VLAN_IDX field 621 which may be used for specifying a VLAN filter index and MIRROR filter index, as the same has been described with the embodiments herein. As the reader will appreciate, these and other filter indexes can be used by the fabric receiver, e.g., 460 in FIG. 4, to index a particular filter table of port masks. According to embodiments, the VLAN_IDX field 621 in FIG. 6B is additionally used as an index to a MIRROR filter table in association differentiating a mirror action on a per port per VLAN basis.

FIGS. 7A-7B illustrates an exemplary buffer reply command split between a first half 770-1 and a second half 770-2. The first half 770-1 of the buffer reply command includes a status field 711 and delay fields 712 and 713. As the reader will appreciate some status may be maintained in a status filter table, and each status may have a particular value and meaning, as the same will be known and understood by one of ordinary skill in the art. As discussed herein, the fabric receiver, e.g., 460 in FIG. 4, may indicate by use of the status and delay fields, 711-713, whether a packet should be sent now, later, or dropped, etc. As shown in FIG. 7A the first half 770-1 of the buffer reply command can include an OUT_MIRROR bit field 714, which may be one or more bits, to indicate that a packet associated with one or more particular ports and one or more particular VLANs is flagged to be egress mirrored, mirror-stolen, etc.

According to embodiments, mirroring packets on a per port per VLAN basis mean that a particular source port may be mirrored differently on different VLANs and/or a subset of ports on a particular VLAN can be mirrored without needing a bit per VLAN per port per action. In this manner, a network administrator can monitor specific ports on a specific VLAN. That is, a given packet may have a mirror applied to mask the packet from an outgoing port list using a mirror filter value derived from a MIRROR filter table, e.g., 570-M in FIG. 5A, in association with a VLAN index, e.g., VLAN_IDX 621 in FIG. 6B. In order to designate a mirror action on particular packets received from or destined to these ports an OUT_MIRROR bit field 714 will be set in the buffer reply 770-1 and 770-2 to indicate that the packet is to have a mirror action applied thereto. Embodiments are not limited to the examples shown in FIGS. 6A-6B and 7A-7B.

Figure 8:
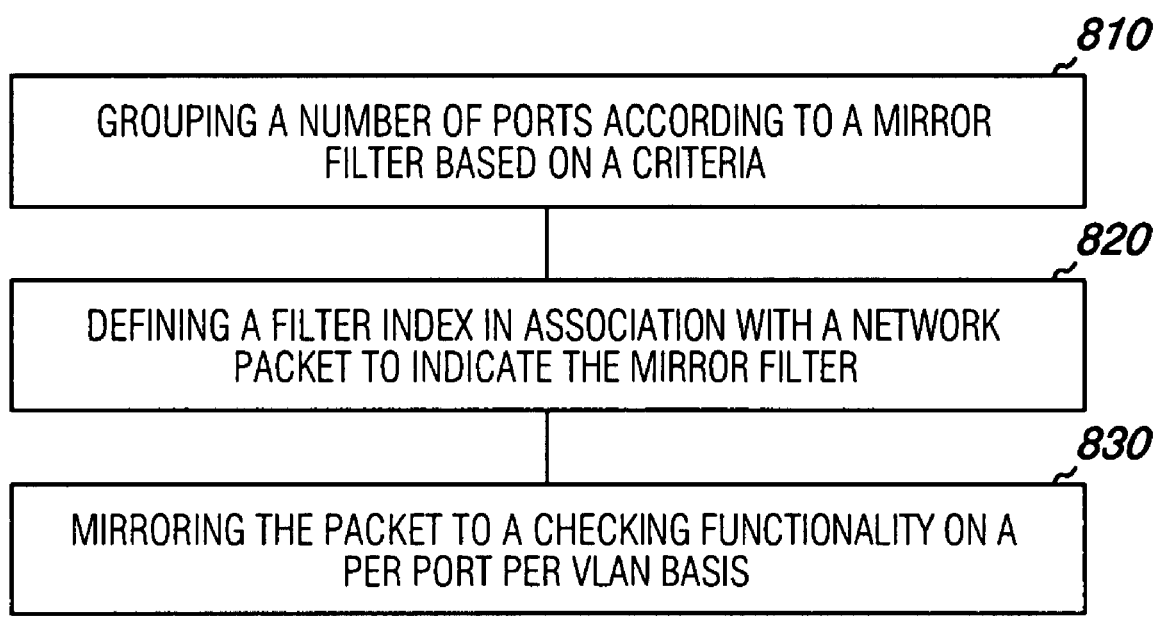
FIG. 8 illustrates a method for packet monitoring according to an embodiment of the present invention.

FIG. 8 illustrates a method for packet monitoring according to an embodiment of the present invention. As shown in the embodiment of FIG. 8 at block 810, the method includes grouping a number of ports according to a mirror filter based on a criteria. At block 820, the method includes defining a filter index in association with a network packet to indicate the mirror filter. The method further includes mirroring the packet to a checking functionality on a per port per VLAN basis, as shown in block 830. Logic, which is operable to perform the method described in connection with FIG. 8 can be present in whole or in part in embodiments of other figures. Embodiments, however, are not limited to the example given herein.

It is to be understood that the above description has been made in an illustrative fashion, and not a restrictive one. Although particular embodiments have been illustrated and described herein, those of ordinary skill in the art will appreciate that other component arrangements and device logic can be substituted for the particular embodiments shown. This claims are intended to cover such adaptations or variations of some embodiments of the disclosure, except to the extent limited by the prior art.

In the foregoing Detailed Description, some features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
    a network chip including logic and a number of network ports for the device for receiving and transmitting packets therefrom; and
    wherein the logic is operable to mirror a packet on a per port per virtual local area network (VLAN) membership basis by selecting ports for a mirror action according to a network port of the network device receiving the packet and a VLAN for the port, and
    the logic is operable to identify a mirror index according to the VLAN for the port and use the mirror index to determine whether the mirror action is a mirror-only action or a mirror-steal action and to identify a filter according to the mirror index to apply to the selected ports for the mirror action,
    if the mirror action is determined to be a mirror-only action, the logic is operable to apply the filter to the selected ports to select ports for the mirror-only action, and
    if the mirror action is determined to be a mirror-steal action, the logic is operable to apply the filter to the selected ports to identify masked ports, wherein the packet is prevented from being sent to the masked ports.

2. The device of claim 1, wherein the logic can mirror a subset of ports on a VLAN to be mirrored.

3. The device of claim 1, wherein the logic can mirror packets requesting access to multiple destination ports.

4. The device of claim 1, wherein the logic can:
  mirror-steal packets associated with a given port for packets having membership in a first VLAN; and
  mirror packets associated with the given port for packets having membership in a second VLAN such that packets received from the given port realize different mirror actions based on VLAN membership.

5. The device of claim 1, wherein the logic can mirror packets of both input and output network traffic on the device.

6. The device of claim 1, wherein the logic accesses a mirror filter table and maps the VLAN to an entry in the mirror filter table to determine the mirror filter index.

7. The device of claim 1, wherein the logic can mirror packets on a destination port.

8. The device of claim 1, wherein the logic can:
  group a number of ports according to the mirror filter table based on a criteria; and
  define an action to steal a packet and remove a port from an access list in addition to setting a mirror bit.

9. The device of claim 8, wherein the criteria includes at least one criteria selected from the group of:
  a physical source port;
  a source media access controller address;
  a destination media access controller address;
  a source IP address;
  a destination IP address;
  a protocol type;
  a source port number;
  a destination port number;
  an IP flow; and
  a port being connected to a wireless network.

10. The device of claim 1, wherein, when the logic can detect an action bit indicating a steal operation and remove a port from an access list and set a mirror bit.

11. The device of claim 10, wherein the logic can mirror-steal a packet to a checking functionality on a set mirror bit.

12. The device of claim 11, wherein the logic mirrors packets to a checking functionality selected from the group of:
  an intrusion prevention system;
  an intrusion detection system;
  a counting device; and
  an accounting device.

13. The device of claim 1, wherein the logic mirrors packets to a checking functionality located in the network in a location selected from the group of:
  a location remote to the device;
  a location on an ingress network chip of the device;
  a location on a network chip different from the ingress network chip, but located on a same plug-in blade of the ingress network chip;
  a location on a different plug-in blade from the same plug-in blade of the ingress network chip;
  a location for a plug-in appliance which is attached locally to the device; and
  a location which is remote from the device.

14. A method performed by logic in a network chip, the method comprising:
  selecting ports for a mirror action according to a network port receiving a packet and a VLAN for the port;
  identifying a mirror index according to the VLAN for the port;
  determining whether the mirror action is a mirror-only action or a mirror-steal action according to the mirror index;
  identifying a filter according to the mirror index;
  if the mirror action is determined to be a mirror-only action, applying the filter to the selected ports to select ports for the mirror-only action; and
  if the mirror action is determined to be a mirror-steal action, applying the filter to the selected ports to identify masked ports, wherein the packet is prevented from being sent to the masked ports.

15. The method of claim 14, wherein the mirror-steal action includes performing a checking functionality on the packet and the method includes:
  re-forwarding the packet to the masked ports if the packet is approved by the checking functionality; and
  dropping the packet if the packet is not approved by the checking functionality.

16. The method of claim 14, wherein the mirror-stealing action includes stealing the packet if a particular action bit is set and removing an associated port from an access list.

17. The method of claim 16, wherein the method includes setting a mirror bit.

18. The method of claim 14, wherein the method includes setting a mirror bit if the mirror action is determined to be the mirror-steal action.

19. A network chip operable with a number of network ports of a device for receiving and transmitting packets therefrom, the chip comprising:
  circuitry, including logic;
  wherein the logic is operable to mirror a packet on a per port per virtual local area network (VLAN) membership basis by selecting ports for a mirror action according to a network port receiving the packet and a VLAN for the port, and
  the logic is operable to identify a mirror index according to the VLAN for the port and use the mirror index to determine whether the mirror action is a mirror-only action or a mirror-steal action and to identify a filter according to the mirror index to apply to the selected ports for the mirror action,
    if the mirror action is determined to be the mirror-only action, the logic is operable to apply the filter to the selected ports to select ports for the mirror-only action, and
    if the mirror action is determined to be the mirror-steal action, the logic is operable to apply the filter to the selected ports to identify masked ports, wherein the packet is prevented from being sent to the masked ports.

* * * * *